No. 767,529. PATENTED AUG. 16, 1904.
W. W. ROBINSON.
VEHICLE.
APPLICATION FILED JAN. 10, 1900.
NO MODEL. 4 SHEETS—SHEET 2.
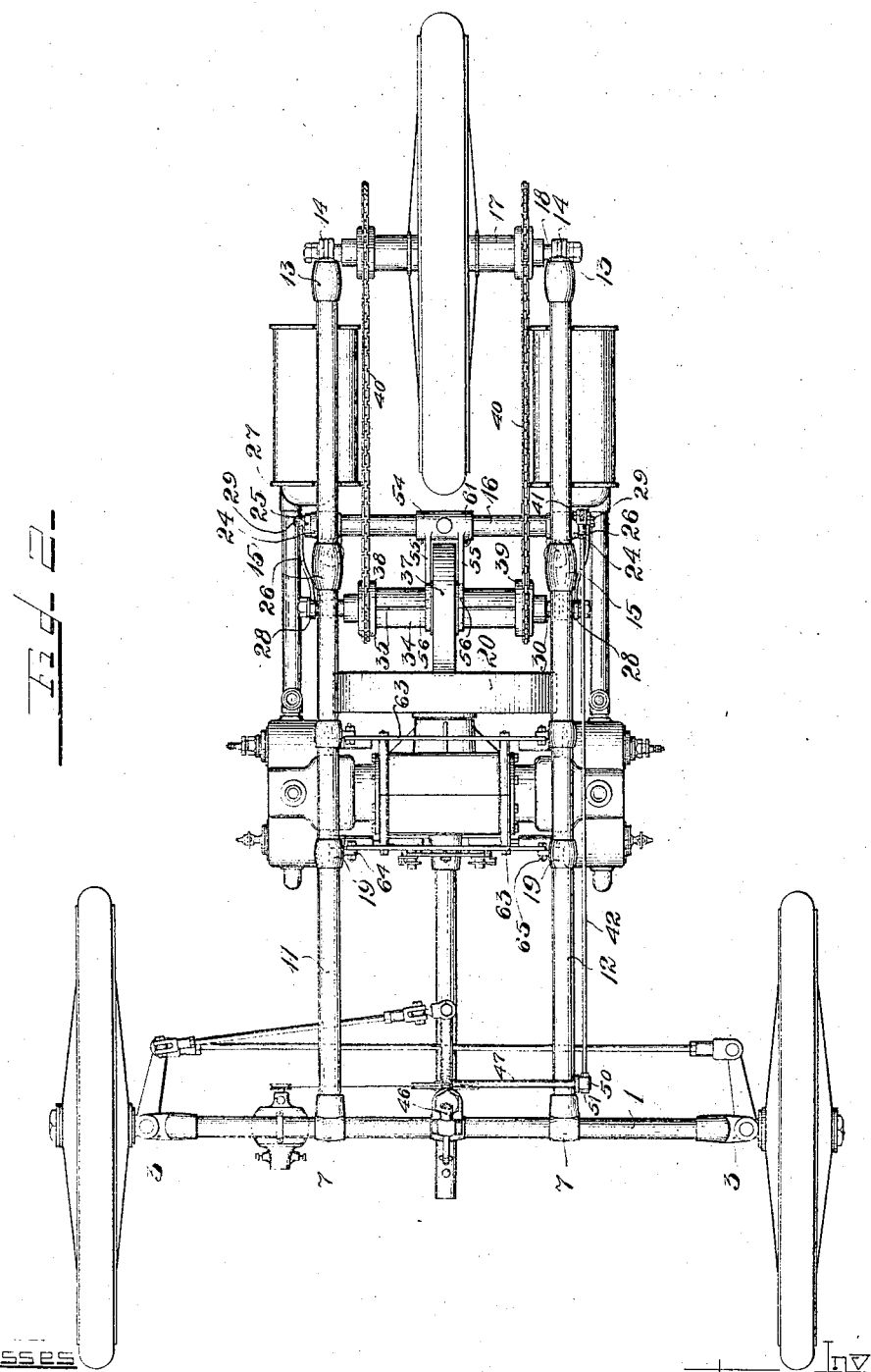

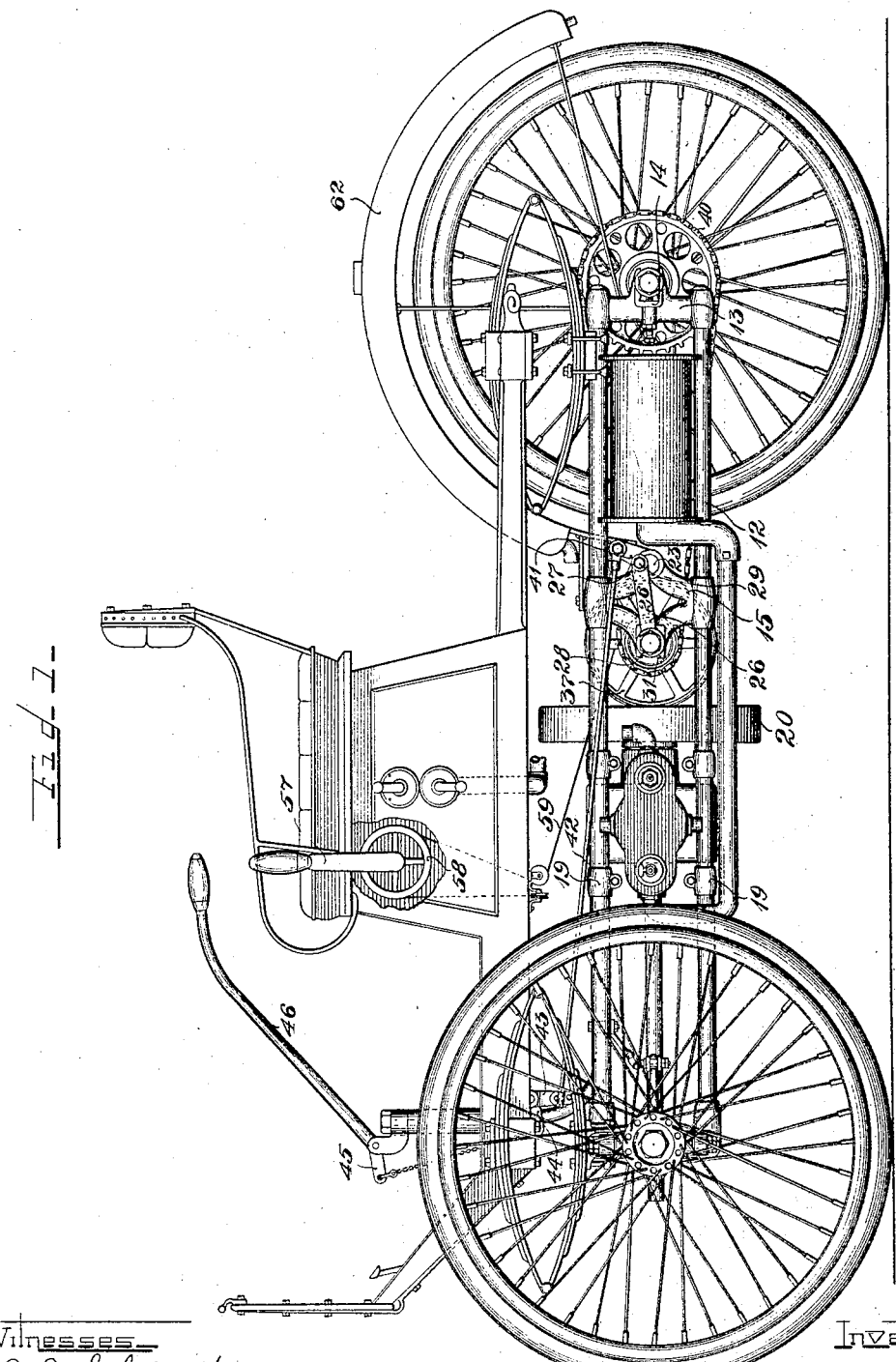

No. 767,529. PATENTED AUG. 16, 1904.
W. W. ROBINSON.
VEHICLE.
APPLICATION FILED JAN. 10, 1900.
NO MODEL. 4 SHEETS—SHEET 3.
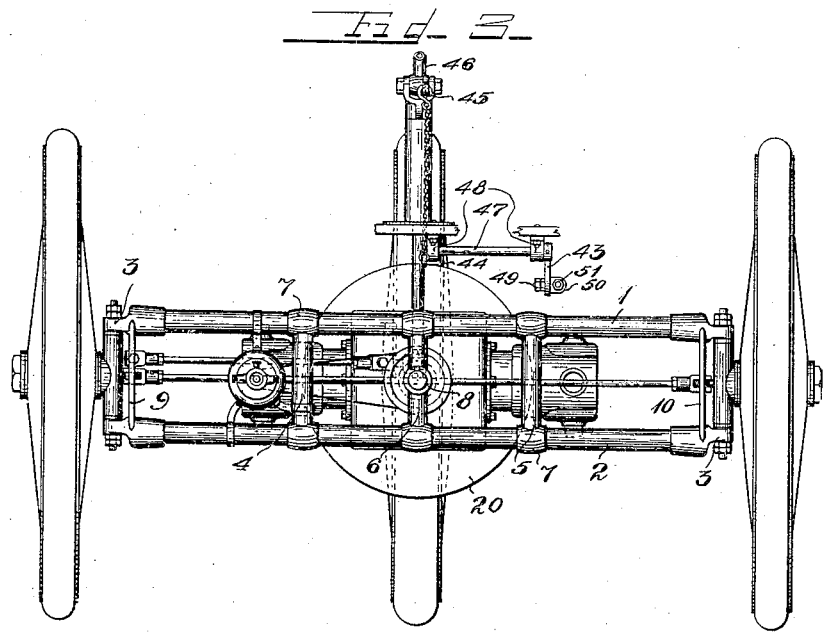
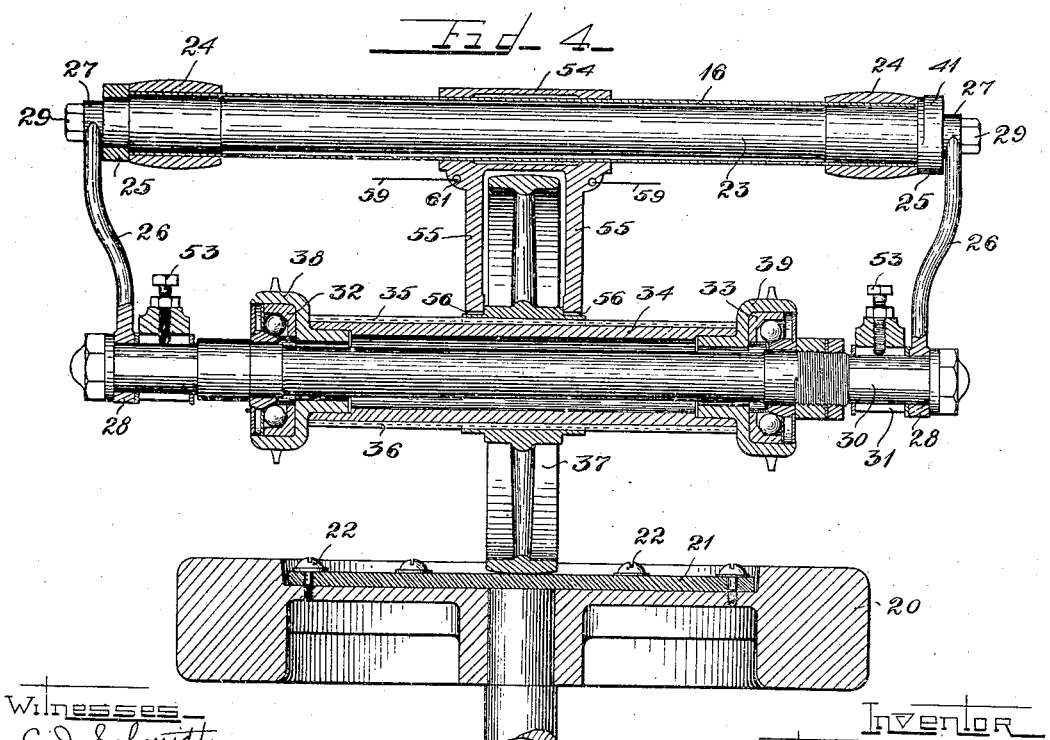
Witnesses
C. J. Schmidt
Max Zabel
Inventor
Walter W. Robinson
By Charles A. Brown & Cragg
Attorneys

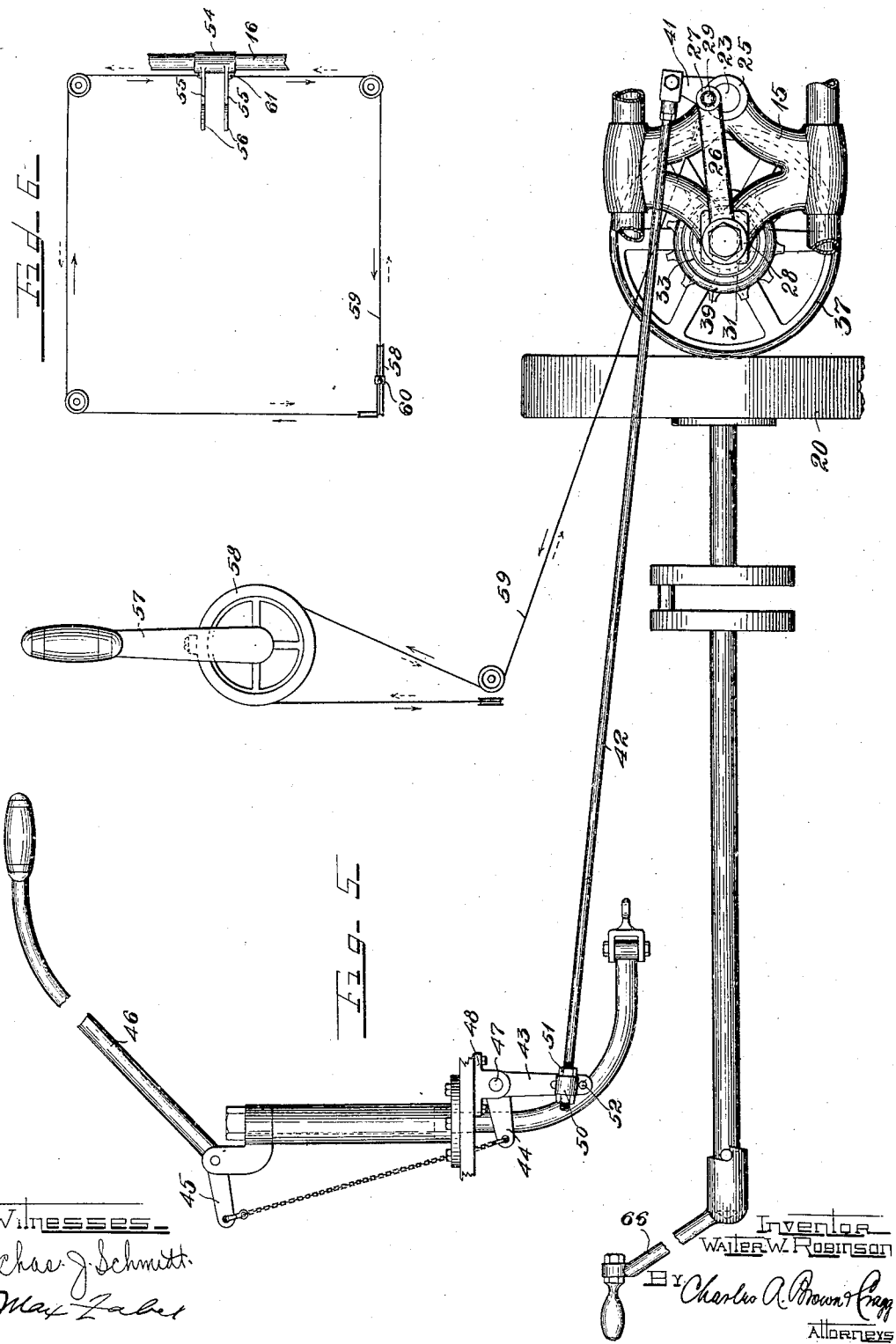

No. 767,529. Patented August 16, 1904.

UNITED STATES PATENT OFFICE.

WALTER W. ROBINSON, OF CHICAGO, ILLINOIS, ASSIGNOR, BY MESNE ASSIGNMENTS, TO FRIEDMAN AUTOMOBILE COMPANY, OF CHICAGO, ILLINOIS, A CORPORATION OF ILLINOIS.

VEHICLE.

SPECIFICATION forming part of Letters Patent No. 767,529, dated August 16, 1904.

Application filed January 10, 1900. Serial No. 929. (No model.)

*To all whom it may concern:*

Be it known that I, WALTER W. ROBINSON, a citizen of the United States, residing at Chicago, in the county of Cook and State of Illinois, have invented a certain new and useful Improvement in Vehicles, (Case No. 6,) of which the following is a full, clear, concise, and exact description, reference being had to the accompanying drawings, forming a part of this specification.

My invention relates to vehicles, and has for its object an improved frame construction therefor, and for its further object an improved propelling means for motor-driven vehicles.

One of the features of my invention is a tubular frame consisting of steel tubes preferably brazed together in such a manner as to form a rigid, light, and endurable frame and in motor-driven vehicles adapted to suitably and conveniently support the various propelling, regulating, and adjusting mechanisms and appliances necessary for propulsion of the vehicle.

A second feature of my invention is a frictional propulsion mechanism in which I preferably employ a friction-wheel capable of being moved diametrically across the face of a revolving friction-surface, which surface I preferably attach to the face of the fly-wheel, said wheel being preferably driven by the motive power of the vehicle.

A third feature of my invention is a means for bringing said friction-wheel into and out of engagement with said friction-surface, preferably controlled in connection with the steering-arm by the operator pressing or releasing said arm.

Another feature of my invention is a shifter mechanism, said mechanism being connected, preferably by cords, to a lever controlled by the operator and enabling the operator to move or shift the above-mentioned friction-wheel across the face of the friction-surface, thereby regulating and controlling the speed of the vehicle, whether said vehicle move in a forward or a backward direction.

A gas-engine, electric motor, or other suitable motive means may be employed for driving the wheel bearing the friction-surface. In describing my invention I have employed a gas-engine, but do not wish to be limited thereto.

I shall explain my invention more clearly by referring to the accompanying drawings, which illustrate the preferred embodiment threof, and in which—

Figure 1 is an elevation of a motor-driven vehicle, showing the preferred general arrangement of the various propelling mechanisms and the controlling and regulating devices necessary therefor. Fig. 2 is a plan view thereof. Fig. 3 is a front view of the vehicle. Fig. 4 is a sectional view showing the construction of the friction-wheel and friction-surface and also illustrating the shifting mechanism in detail. Fig. 5 is a view of the propelling mechanism and the several controlling and regulating devices separated from the body of the vehicle. Fig. 6 shows the arrangement of the cords which are operative on the shifting device.

Like characters of reference refer to like parts throughout the several figures.

The frame preferably consists of a transverse section and a longitudinal section firmly fastened together.

The transverse section preferably consists of tubes 1 and 2, Fig. 3, parallel to each other and terminating at either end in terminals elongated to form bearings 3. Brace members 4, 5, and 6 are interposed between tubes 1 and 2, being firmly fastened, preferably brazed thereto by means of collars 7, brace 6 being more particularly useful for supporting a bearing 8, through which I preferably project the shaft of the gas-engine for application of the starting-handle 66. Ribs 9 and 10 serve particularly to lend rigidity to bearings 3.

The longitudinal section preferably consists of two pairs 11 and 12 of parallel tubes, each pair terminating at the rear end in a member 13, which besides acting as a brace carries the adjusting mechanism 14 for adjusting the position of the rear axle. Another member 15 acts also as a brace, but is particularly shaped and adapted to serve as a support for the various parts of the propelling mechanisms. The pairs 11 and 12 are held rigid with regard to each other preferably by a transverse tube 16, also by a shaft 18, supporting the driven axles, which shaft when in adjustment is perfectly rigid as far as lateral motion is concerned. By securely fastening (preferably brazing) the longitudinal section just described to the transverse section by means of collars 7 a rigid, endurable, strong, and light frame is obtained. The motive means is supported on the frame-collars 19, being preferably bolted thereto, said collars being slid onto the tubes and fastened thereto, preferably by clamping.

A wheel 20 is mounted upon the shaft of the motor, (being in this case a gas-engine,) a disk 21 of friction material—for example, leather—being fastened to said wheel by means of screws 22. A shaft 23 passes through tube 16, said tube being securely brazed to sleeves 24, which form part of members 15. Immediately outside of sleeves 24 collars 25 are keyed to shaft 23. Arms 26 are enlarged at either end to form bearings 27 and 28, bearings 27 being eccentrically pivoted to collars 25 by means of bolts 29. Bearings 28 are in rotatable engagement with shaft 30, said shaft being supported in jaws 31 and suitably turned and threaded to receive ball-bearings 32 and 33. Said bearings are held in rigid relation to each other by a sleeve 34, said sleeve being supplied with keys 35 and 36, fitting into corresponding keyways in the hub of the friction-wheel 37, said wheel being thus enabled to move longitudinally along sleeve 34, but cannot rotatably move with respect thereto, and therefore upon rotation must carry said sleeve with it and also the casings 38 and 39 of the bearings 32 and 33, which casings I preferably tooth for the accommodation of chains 40, which I employ for transmission of power from the driving-axle or sleeve 34 to the driven axle 17, said driven axle being also preferably supported by ball-bearings.

An arm 41, forming an integral part of collar 25, is rotatably connected with a rod 42, said rod extending to the fore part of the vehicle, being there pivotally connected to one arm, 43, of a bell-crank-lever arrangement, the other arm, 44, of which being connected, preferably, by chain to a projection 45 on the steering-handle 46. Said arms are securely fastened to a transverse shaft 47, said shaft resting and rotating in bearings 48, said bearings being preferably fastened to the under side of the vehicle-floor.

By pressure on the handle 46 arm 45 is raised, together with arm 44 of the bell-crank lever. Arm 43 moves forward, and being connected by rod 42 to arm 41 said arm 41 also moves forward, thus rotating shaft 23, and with it collars 25. Arms 26, being eccentrically pivoted to collars 25 by bolts 29, are also moved forward, carrying with them shaft 17, said shaft sliding forward in jaws. Thus the friction-wheel 37 is brought forward into contact with the friction-disk 21, and the force of contact is measured by the amount of pressure applied to handle 46. Lever-arm 43 rotatably engages with pivot-bolt 49, Fig. 3, said shaft being an integral part of collar 50, through which rod 42 passes. Nuts 51 enable adjustment of the service length of rod 42, and by means of holes 52, through which passes pivot-bolt 49, variation in leverage is obtained. Bolts 53 control and determine the back travel of shaft 33. The handle 46 thus performs two functions—namely, by rotation thereof the steering of the vehicle and by pressure thereon the propulsion of the vehicle.

The regulation of the speed of the vehicle is accomplished by a shifter mechanism which I preferably employ and by means of which the friction-wheel 37 is moved and guided diametrically over the face of the friction-disk 21, the speed varying directly with the radial distance of the friction-wheel from the center of the friction-disk. The shifting device consists of a hub 54, capable of longitudinal movement along tube 16, said tube also acting as a brace for the frame, and two projecting parallel arms 55, said arms terminating in semicircular forks 56, which engage a finished shoulder on the hub of the friction-wheel 37. The position of the shifter on tube 16 is determined by the controlling-handle 57, said handle being firmly connected to a pulley-wheel 58, a cord or cable 59 being secured to said pulley by clamp 60, said cord passing over said pulley and around several smaller pulleys, finally attaching to the shifter-guide 54 by means of holes 61. For a forward motion of the controlling-handle 57 from its central position the cord being clamped to pulley 58 moves in a direction indicated by dotted arrows, the vehicle preferably moving forward for such forward motion of the controller. For a backward motion of the controller from a central position the vehicle moves backward, the motion of the cord being in the direction indicated by full arrows.

It is thus seen that equal regulations of speed are obtainable for either forward or reverse motion of the vehicle.

The motor is suspended upon the tubular frame by means of the bars 63 63, bolted to the ears 64 64, which are integral with the frame-collars 19 19. The bolts 65 65 serve to fasten the motor to the said bars. At the same time the motor is easily detached, it being only necessary to unscrew the fastening-bolts to remove the engine. These cross-bars joining the side members of the frame also afford strength and rigidity to the frame.

By means of the various devices and mechanisms I have employed I am enabled greatly to simplify the construction of motor-vehicles, and as it is obvious that changes may be readily made in the details of construction of these various mechanisms and devices I do not wish to be limited to the precise form and construction shown in the accompanying drawings; but, Having, however, described my invention, I claim as new and desire to secure by Letters Patent—

1. In a motor-vehicle, the combination with a supporting-frame, of a motor supported thereby, a driving friction-disk driven by the motor, a driven friction-wheel arranged to be driven by the friction-disk, a movable support carrying said friction-wheel and arranged for movement toward and away from the driving-disk, steering mechanism, an operating-handle mounted so as to permit its being swung in both horizontal and vertical planes, and mechanisms for operating the steering mechanism and for shifting the friction-wheel toward and away from the friction-disk, one of said mechanisms being operable by a movement of the operating-handle in one plane and the other by the movement of the same in the other plane, substantially as described.

2. In a motor-vehicle, the combination with a supporting-frame, of a motor supported thereby, a driving friction-disk driven by the motor, a driven friction-wheel arranged to be driven by the friction-disk, a movable support carrying said friction-wheel and arranged for movement toward and away from the driving-disk, steering mechanism, an operating-handle mounted so as to permit its being swung in both horizontal and vertical planes, and mechanisms for operating the steering mechanism and for shifting the friction-wheel toward and away from the friction-disk, the mechanism for operating the steering mechanism being actuated by a movement of the handle in a horizontal plane and that for shifting the driven wheel being actuated by a movement of the handle in a vertical plane, substantially as described.

3. In a motor-vehicle, the combination with the body-frame and also with the steering mechanism; of a motor supported by the frame; a driven friction-disk driven by the motor; a driven friction-wheel arranged to be driven by said friction-disk, and mounted upon a sleeve so as to be rotated thereby, and also so that it can be moved along the same; a spindle carrying said sleeve and having its ends mounted in guideways adapted to allow a movement of the spindle so as to bring the friction-wheel into and out of engagement with the friction-disk; an operating-handle and mechanism whereby the same can operate both the steering mechanism and the movable spindle carrying the friction-wheel sleeve; and an independent device for shifting said wheel longitudinally along its sleeve, substantially as described.

4. In a motor-vehicle, the combination with the frame, of the motor carried thereby; a friction driving-disk driven by the motor; a friction driving-wheel arranged to be driven by the driving-disk; and mounted upon a sleeve so as to be rotated thereby and also to be capable of movement longitudinally along the same; means for shifting such wheel along its sleeve; a spindle carrying said sleeve and mounted in guideway-bearings adapted to allow the movement of the same in a way to bring the friction-wheel into and out of contact with the friction-disk; eccentrics connected by links with said spindles for moving the same; an arm and rod connected thereto for turning said eccentrics; a bell-crank having one of its arms connected with said rod; a chain connected with the other arm of said bell-crank; and an operating-handle having a lever-arm connected with said chain, substantially as described.

5. In a motor-vehicle, the combination with the body-frame; of a motor supported thereby; mechanism for driving the vehicle by the motor; means for connecting and disconnecting said driven mechanism so as to start and stop the vehicle; steering mechanism; an operating-handle connected with said steering mechanism for operating the same by a longitudinal movement; and a flexible conductor connecting said handle and said connecting and disconnecting means, and adapted to operate the same by a vertical movement whereby the handle can be swung vertically, irrespective of its position in horizontal adjustment, and vice versa, substantially as described.

6. In a motor-vehicle, the combination with a supporting-frame, of a motor carried thereby, a friction-wheel driven by said motor, a driven wheel the periphery of which is adapted to make contact with the face of said driving friction-wheel, a hollow shaft adapted to carry said driven friction-wheel, a tube or bar running through said hollow shaft and adapted to be moved to bring said driven wheel into or out of engagement with said driving-wheel, a tube or bar parallel with said hollow shaft, and means connected with said last-named tube or bar for shifting the friction-driven wheel to different radial points of contact with the driving-wheel, substantially as described.

7. In a vehicle-frame, the combination with a front transverse member consisting of two parallel tubes lying in a vertical plane, of side members extending longitudinally of the vehicle, each of said side members being composed of two parallel tubes lying in vertical planes, a rear member consisting of a single transverse tube or bar supporting a rotatable sleeve upon which is mounted the driven wheel of the vehicle, vertical tubes at each end of the front transverse member adapted to rock in bearings provided upon each end of the tubes of said transverse member, bearings for the front wheels attached to said upright tubes, steering mechanism also attached to said upright tubes, and transverse bars joining the two side members of the frame and supporting the motor and regulating mechanism of the vehicle and at the same time rigidly holding said frame, substantially as described.

8. In a vehicle-frame, the combination with a front transverse member comprising parallel tubes arranged in a vertical plane, of vertical tubes or bars joining said parallel tubes, bearings for the front vehicle-wheels rigidly attached to said upright tubes or bars, side members comprising parallel tubes in a vertical plane joining said front and rear members, intermediate tubes or bars adapted to support the motor driving and regulating mechanism, vertical bars joining the upper and lower tubes of each side member, jaws in said last-named vertical bars, a transverse tube or bar resting in said jaws and constituting a bearing-support for a rotating sleeve upon which a rear wheel of the vehicle is mounted, and means for adjusting said last-named bar or tube in a direction at right angles to its length, substantially as and for the purpose set forth.

9. In a motor-vehicle, the combination with a supporting-frame, substantially as described, of a motor suspended thereby, a wheel driven by said motor, a friction-wheel engaging with the side of said first-named wheel, a hollow shaft upon which said driven friction-wheel is adapted to rotate, a tube or bar supporting said hollow shaft, a slot in which said tube or bar is mounted and adapted to be moved in a direction toward or away from the plane of the driving-wheel of the motor, a tube or bar parallel to the rotating shaft carrying the driven wheel and adapted to be rocked in its bearings, a link at one end eccentrically attached to said last-named tube or bar, and at the other end to the tube or bar supporting the rotating shaft of the driven wheel, and means for rotating the tube or bar to which said link is attached, whereby the driven wheel is moved toward or away from the face of the driving-wheel, substantially as described.

10. In a motor-vehicle, the combination with a supporting-frame, substantially as described, of a motor suspended thereby, a driving-wheel 20, a driven wheel 37, a tube or rod 30 adapted to support the rotating sleeve 34, jaws 31 adapted to afford a bearing for the ends of the said rod 30, the rod or tube 23, the links 26, 26, eccentrically connected at one end to the rod 23 and at the other end connected to the rod or tube 30, the lever 41 connected to the operating-lever of the vehicle and the members 15, 15, rigidly attached to said frame and supporting the said rods or tubes and levers, for the purpose set forth.

11. In a motor-vehicle, the combination with a frame having two side members comprising each two tubes or bars lying in a vertical plane, of a member supported by said frame, a driving-wheel adapted to rotate transversely to the direction of motion of the vehicle, a driven wheel adapted to make frictional engagement with the side of said driving-wheel, upright members 15, 15, connecting the two parallel tubes of each side member and adapted to support the shaft upon which said driven wheel rotates, jaws in said member 15, adapted to permit the adjustment of the driven wheel toward or away from the driving-wheel, means supported by said member 15 for effecting the adjustment of said driven wheel, a pulley carried by said driven wheel, and flexible means for transmitting power from said pulley to the shaft of the vehicle-driving wheel, substantially as and for the purpose set forth.

12. In a motor-vehicle, the combination with a frame supporting the motor, of a friction driving-wheel, a driven wheel at right angles to said driving-wheel, a shaft upon which said driven wheel is mounted and adapted to rotate, longitudinal keys on said rotating shaft which permit the said wheel to be shifted in a longitudinal direction thereon, a second shaft parallel to the rotating shaft of the driven wheel, a tube inclosing said second shaft rigidly attached to the frame of the vehicle, arms eccentrically attached to said second shaft and adapted upon the rotation of said second shaft to move the driven wheel toward or away from the driving-wheel, adjusting-screws to limit the excursion of the driven-wheel shaft, lever mechanism adapted to rotate said second shaft, a hub adapted to travel lengthwise of the sleeve surrounding said second shaft, parallel arms extending from said hub and embracing the driven wheel, and lever mechanism attached to said hub and adapted to shift it upon the said sleeve, whereby the driven wheel is shifted longitudinally of its shaft, substantially as and for the purpose set forth.

13. In a motor-vehicle, the combination with a frame, comprising a front member, two side members consisting each of two parallel tubes, lying in a vertical plane, intermediate bars or tubes for supporting the motor mechanism, and a rear member consisting of a single bar or tube supporting a rotatable sleeve, of a flexible connection between said motor mechanism and said rotatable sleeve, a single rear wheel mounted upon said rotatable sleeve, and means for adjusting said rear member of the frame in a horizontal direction, substantially as described.

In witness whereof I hereunto subscribe my name this 6th day of January, A. D. 1900.

WALTER W. ROBINSON.

Witnesses:
CHARLES A. BROWN,
CHARLES E. HUBERT.